(12) United States Patent
Wang et al.

(10) Patent No.: US 12,213,012 B2
(45) Date of Patent: Jan. 28, 2025

(54) CELL HANDOVER MEASUREMENT INDICATION METHOD, NETWORK DEVICE, AND TERMINAL

(71) Applicant: HUAWEI TECHNOLOGIES CO., LTD., Guangdong (CN)

(72) Inventors: Yu Wang, Hangzhou (CN); Hejia Luo, Hangzhou (CN); Xian Meng, Hangzhou (CN); Yunfei Qiao, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 367 days.

(21) Appl. No.: 17/504,347

(22) Filed: Oct. 18, 2021

(65) Prior Publication Data
US 2022/0038964 A1 Feb. 3, 2022

Related U.S. Application Data

(63) Continuation of application No. PCT/CN2020/083632, filed on Apr. 8, 2020.

(30) Foreign Application Priority Data

Apr. 17, 2019 (CN) .......................... 201910309135.9

(51) Int. Cl.
*H04W 36/00* (2009.01)
*H04W 36/32* (2009.01)

(52) U.S. Cl.
CPC ... *H04W 36/0058* (2018.08); *H04W 36/0061* (2013.01); *H04W 36/322* (2023.05); *H04W 36/00835* (2018.08)

(58) Field of Classification Search
CPC ..... H04W 36/00; H04W 36/24; H04W 36/30; H04W 36/32; H04W 36/08; H04W 36/14;
(Continued)

(56) References Cited

U.S. PATENT DOCUMENTS 8,478,262 B2 * 7/2013 Sun .................. H04W 36/0088
455/423
8,934,908 B2 * 1/2015 Han .................. H04W 36/0085
455/437
(Continued)

FOREIGN PATENT DOCUMENTS

CN 101073216 B 11/2010
CN 102647767 A 8/2012
(Continued)

*Primary Examiner* — Man U Phan

(57) ABSTRACT

Embodiments of this application disclose cell handover measurement indication methods, a network device, and a terminal, to improve reliability and real-time performance of cell handover. A cell handover measurement indication method includes: A network device calculates a measurement moment of cell handover based on a measurement event and sends a measurement indication. The measurement event is a location relationship between a terminal and the network device, and the measurement indication is used to indicate the terminal to perform cell handover measurement. The measurement indication sent by the network device may be used to notify the measurement moment of cell handover to the terminal.

16 Claims, 5 Drawing Sheets

(58) Field of Classification Search
CPC ....... H04W 4/02; H04W 24/10; H04W 24/02;
H04W 56/00; H04W 64/00; H04W 74/08;
H04W 88/06; H04W 84/06; H04W 76/11;
H04L 5/00; H04B 7/185
USPC ......................................................... 370/331
See application file for complete search history.

(56) References Cited

U.S. PATENT DOCUMENTS

| | | | | |
|---|---|---|---|---|
| 9,130,688 | B2* | 9/2015 | Yiu | H04W 76/27 |
| 9,510,259 | B2* | 11/2016 | Müller et al. | H04W 24/08 |
| 9,888,426 | B2* | 2/2018 | Ulupinar | H04B 7/18541 |
| 9,894,575 | B2* | 2/2018 | Masini | H04W 76/27 |
| 9,913,202 | B2* | 3/2018 | Xu | H04W 48/16 |
| 10,117,139 | B1 | 10/2018 | Shahi et al. | |
| 10,356,675 | B2* | 7/2019 | Kinthada Venkata | H04W 36/0079 |
| 10,595,359 | B2* | 3/2020 | Kim | H04W 76/28 |
| 10,757,618 | B2* | 8/2020 | Kim | H04W 36/0058 |
| 11,805,458 | B2* | 10/2023 | Xie | H04W 74/0833 |
| 2008/0167041 | A1* | 7/2008 | Wang | H04W 36/302 455/436 |
| 2008/0189970 | A1 | 8/2008 | Wang et al. | |
| 2013/0095819 | A1* | 4/2013 | Cheng | H04W 36/0094 455/424 |
| 2014/0256311 | A1 | 9/2014 | Müller et al. | |
| 2016/0105831 | A1 | 4/2016 | Masini et al. | |
| 2018/0324626 | A1 | 11/2018 | Zhang et al. | |
| 2018/0364065 | A1 | 12/2018 | Toda | |

FOREIGN PATENT DOCUMENTS

| | | |
|---|---|---|
| CN | 102685798 A | 9/2012 |
| CN | 102958123 A | 3/2013 |
| CN | 107295468 A | 10/2017 |
| CN | 108243463 A | 7/2018 |
| CN | 108260176 A | 7/2018 |
| CN | 108282810 A | 7/2018 |
| CN | 108594275 A | 9/2018 |
| CN | 109041150 A | 12/2018 |
| KR | 20140072124 A | 6/2014 |
| KR | 101867831 B1 | 6/2018 |
| WO | 2016179037 A1 | 11/2016 |

* cited by examiner

CELL HANDOVER MEASUREMENT INDICATION METHOD, NETWORK DEVICE, AND TERMINAL

CROSS-REFERENCE TO RELATED APPLICATIONS

This application is a continuation of International Application No. PCT/CN2020/083632, filed on Apr. 8, 2020, which claims priority to Chinese Patent Application No. 201910309135.9, filed on Apr. 17, 2019. The disclosures of the aforementioned applications are hereby incorporated by reference in their entireties.

TECHNICAL FIELD

This application relates to the field of mobile communication technologies, and in particular, to a cell handover measurement indication method, a network device, and a terminal.

BACKGROUND

In the field of mobile communication technologies, to ensure that a terminal in a moving state can maintain smooth communication, the terminal needs to frequently perform cell handover operations. In a current mobile communication handover technology, cell handover is usually performed based on a terminal location.

In a terminal location-based handover solution, a network device calculates, in advance, handover moments of the terminal in different cells based on information such as a terminal location and a motion track of the terminal, and notifies the handover moments to the terminal. When a handover moment arrives, the terminal directly performs cell handover.

In the foregoing handover solution, because the terminal is prone to be affected by weather, cloud shielding, a movement status change of the terminal, and the like, a handover moment predicted in advance is inaccurate or even invalid, and the terminal performs excessively premature or delayed handover. Consequently, in the foregoing handover solution, real-time performance and reliability of cell handover are relatively low.

SUMMARY

To overcome technical defects of low reliability and low real-time performance in the foregoing terminal location-based handover solution, embodiments of this application provide a cell handover measurement indication method, a network device, and a terminal, to improve reliability and real-time performance of cell handover.

According to a first aspect, an embodiment of this application provides a cell handover measurement indication method, including: A network device calculates a measurement moment of cell handover based on a measurement event, and sends a measurement indication, where the measurement event is a location relationship between a terminal and the network device, and the measurement indication indicates the terminal to perform cell handover measurement. The measurement indication sent by the network device may be used to notify the measurement moment of the cell handover to the terminal.

It can be learned from the cell handover measurement indication method that the network device calculates the measurement moment of the cell handover based on the location relationship between the terminal and the network device, and indicates the terminal to perform the cell handover measurement at the measurement moment. It is easily understood that, in the cell handover measurement indication method in this embodiment of this application, the network device calculates the measurement moment based on the location relationship, and the terminal performs the cell handover measurement based on the measurement moment. The network device and the terminal simultaneously participate in cell handover decision making, and this can effectively improve reliability and real-time performance of cell handover.

In a possible implementation of the first aspect, the measurement event in this embodiment of this application may include at least one of the following two measurement events: a first measurement event or a second measurement event. The first measurement event may be that a distance between the terminal and a center point of a serving cell is greater than a first threshold, where the serving cell may be a cell providing a service for the terminal and includes but is not limited to a current serving cell, and the center point of the serving cell described above may also be referred to as a beam center point or another reference point. The second measurement event may be that a distance between the terminal and the network device is greater than a second threshold. Optionally, the network device may be a base station, a communication satellite, or the like. When the network device is the base station, the second measurement event is that a distance between the terminal and the base station is greater than the second threshold. When the network device is the communication satellite, the second measurement event is a distance between the terminal and a ground mapping point of the communication satellite or another reference point is greater than the second threshold. It can be learned from this implementation that, by introducing a related measurement event based on the location relationship between the network device and the terminal, triggering cell handover measurement may simplify signaling interaction between the network device and the terminal, thereby reducing signaling overheads.

In a possible implementation of the first aspect, the measurement moment may include at least one of a measurement start moment, a measurement end moment, or a time offset, where the time offset is a time difference between the measurement start moment and the measurement end moment. Specifically, the measurement moment may include the measurement start moment and the measurement end moment, or may include the measurement start moment and the time offset.

In a possible implementation of the first aspect, a specific sending manner in which the network device sends the measurement indication may be sending the measurement indication by using a radio resource control message or downlink control information. In other words, the measurement indication that carries the measurement moment is carried in the radio resource control message or the downlink control information for sending. Specifically, when the measurement moment may include the measurement start moment and the measurement end moment, the network device may add the measurement start moment and the measurement end moment to the radio resource control message or the downlink control information, and send the radio resource control message or the downlink control information to the terminal, or when the measurement moment may include the measurement start moment and the time offset, the network device may add the measurement start moment and the time offset to the radio resource control message or the downlink control information, and send the radio resource control message or the downlink control information to the terminal. It should be noted that the measurement indication may be further sent by using another message other than the radio resource control message or the downlink control information. This is not limited in this application. It can be learned from this implementation that the measurement indication is sent by using the radio resource control message or the downlink control information, and there is no need to add new signaling, thereby reducing signaling overheads.

In a possible implementation of the first aspect, the network device may send the measurement indication by reusing a field or adding a new field. For example, the network device may reuse an existing field in the radio resource control message or the downlink control information to send the measurement indication, or the network device may add a new field to the radio resource control message or the downlink control information to send the measurement indication, where the newly added field may use a reserved field in the radio resource control message or the downlink control message.

In a possible implementation of the first aspect, the measurement indication may include the measurement moment of one or more cells, where the one or more cells include the serving cell, and a plurality of cells mean two or more cells. Optionally, in a base station scenario, the cells may be cells corresponding to a same base station, or cells corresponding to different base stations. Similarly, in a communication satellite scenario, the cells may be cells corresponding to a same communication satellite, or cells corresponding to different communication satellites.

In a possible implementation of the first aspect, in different scenarios, the first threshold and the second threshold are determined in different manners. Optionally, when the network device is the communication satellite, the first threshold and/or the second threshold may be determined based on at least one of a first cell handover delay, a cell diameter corresponding to the serving cell, an orbit height of the communication satellite, a motion speed of the communication satellite, or a service type of the terminal, where the first cell handover delay includes a delay of handover between cells covered by a same communication satellite, or a delay of handover between cells covered by different communication satellites. Optionally, when the network device is the base station, the first threshold and/or the second threshold may be determined based on at least one of a second cell handover delay, a cell diameter corresponding to the serving cell, or a service type of the terminal, where the second cell handover delay includes a delay of handover between cells covered by a same base station, or a delay of handover between cells covered by different base stations.

In a possible implementation of the first aspect, the indication method further includes: The network device calculates the measurement moment of the cell handover based on the first threshold. Specifically, if the network device is the base station, the base station performs calculation based on the first threshold, location information of the center point of the serving cell, and a signal coverage area of the serving cell, to obtain a handover point location corresponding to the first measurement event, and the base station obtains the measurement moment of the cell handover through calculation based on the handover point location. If the network device is the communication satellite, the communication satellite performs calculation based on the first threshold, location information of the center point of the serving cell, and a signal coverage area of the serving cell, to obtain a handover point location corresponding to the first measurement event, and the communication satellite obtains the measurement moment of the cell handover through calculation based on the handover point location and a moving speed of the communication satellite.

In a possible implementation of the first aspect, the indication method further includes: The network device calculates the measurement moment of the cell handover based on the second threshold. Specifically, if the network device is the base station, the base station performs calculation based on the second threshold, location information of the base station, and a signal coverage area of the base station, to obtain a handover point location corresponding to the second measurement event, and the base station obtains the measurement moment of the cell handover through calculation based on the handover point location. If the network device is the communication satellite, the communication satellite performs calculation based on the first threshold, location information of the ground mapping point of the communication satellite, and a signal coverage area of the communication satellite, to obtain a handover point location corresponding to the first measurement event, and the communication satellite obtains the measurement moment of the cell handover through calculation based on the handover point location and a moving speed of the communication satellite.

According to a second aspect, an embodiment of this application provides a cell handover measurement indication method, including: A terminal receives a measurement indication, where the measurement indication indicates the terminal to perform cell handover measurement, or the measurement indication indicates a cell to perform a cell measurement operation, the measurement indication carries information about a measurement moment of cell handover, the measurement moment is obtained by a network device through calculation based on a measurement event, the measurement event is a location relationship between the terminal and the network device, in other words, the measurement event is determined based on the location relationship between the terminal and the network device, and the measurement indication received by the terminal may be sent by the network device; and the terminal performs the cell handover measurement based on the measurement moment carried in the measurement indication. Specifically, when the measurement moment indicated by the measurement indication is reached, the terminal performs the cell handover measurement. Optionally, the terminal may further trigger the cell handover based on the measurement moment in the measurement indication.

It can be learned from the foregoing cell handover measurement indication method that, the terminal performs the cell handover measurement based on the measurement moment indicated by the measurement indication, and the measurement moment is determined based on the measurement event corresponding to the location relationship between the terminal and the network device. Therefore, in the cell handover measurement indication method in this embodiment of this application, the network device calculates the measurement moment based on the location relationship, and the terminal performs the cell handover measurement based on the measurement moment. The network device and the terminal simultaneously participate in cell handover decision making, and this can effectively improve reliability and real-time performance of cell handover.

In a possible implementation of the second aspect, according to the indication method in the second aspect, after the terminal performs the cell handover measurement, the terminal may send a measurement report to the network device, and the network device makes a cell handover decision, or the terminal may directly trigger a cell handover procedure based on the measurement report to perform cell handover.

Other possible implementations and beneficial effects of the second aspect are the same as those of the first aspect. For related description of the other possible implementations and the beneficial effects of the second aspect, refer to the description of the possible implementations of the first aspect. Details are not described herein again.

According to a third aspect, an embodiment of this application provides a cell handover measurement indication method, including: A network device sends a measurement indication, where the measurement indication is used to indicate a terminal to perform cell handover measurement, the measurement indication carries a measurement moment of cell handover, and the measurement moment may be obtained by the network device through calculation based on a measurement event determined based on a location relationship between the terminal and the network device.

In a possible implementation of the third aspect, that the network device makes a cell handover decision specifically includes: after the network device sends the measurement indication, the indication method further includes: The network device receives a measurement report of the terminal, and the network device sends a cell handover indication based on the measurement report, specifically, the network device makes the cell handover decision based on the measurement report, and if it is determined that the cell handover needs to be performed, the network device sends, to the terminal, a cell handover indication that indicates the terminal to perform the cell handover; otherwise, the network device sends, to the terminal, a cell handover indication that indicates the terminal not to perform the cell handover.

In a possible implementation of the third aspect, that the terminal side makes a cell handover decision specifically includes: after the network device sends the measurement indication, the network device receives a cell handover indication, where the cell handover indication may be sent by the terminal, or the cell handover indication may be sent by a target network device to which the terminal is handed over, and the cell handover indication is used to indicate to perform the cell handover; and finally, the network device performs the cell handover, to hand over the terminal to the target network device.

According to a fourth aspect, an embodiment of this application provides a cell handover measurement indication method, including: A terminal receives a measurement indication, where the measurement indication is used to indicate the terminal to perform cell handover measurement, the measurement indication carries a measurement moment of cell handover, the measurement moment is obtained through calculation based on a measurement event, and the measurement event is a location relationship between the terminal and a network device.

In a possible implementation of the fourth aspect, the indication method further includes: The terminal performs the cell handover measurement based on the measurement indication; and the terminal sends a measurement report, where the measurement report is generated by the terminal based on a result of the cell handover measurement.

In a possible implementation of the fourth aspect, the indication method further includes: The terminal performs the cell handover measurement based on the measurement indication; and the terminal performs the cell handover based on a result of the cell handover measurement.

It should be noted that description of other related parts of the third aspect and the fourth aspect is similar to that of the first aspect. For specific description, refer to the description of the first aspect. Details are not described herein again.

According to a fifth aspect, an embodiment of this application provides a cell handover measurement indication method, including: A terminal calculates a measurement moment of cell handover based on a measurement event, where the measurement event is a location relationship between the terminal and a network device; and the terminal performs cell handover measurement based on the measurement moment.

It is easily understood that, a difference between the indication method provided in the fifth aspect of the embodiments of this application and the indication method described in the second aspect lies in that the measurement moment of the cell handover is calculated by the terminal based on the measurement event other than the network device. Therefore, description of other related parts of the fifth aspect is similar to that of the first aspect. For specific description, refer to the description of the first aspect. Details are not described herein again.

According to a sixth aspect, an embodiment of this application provides a network device, including: a processing module and a sending module. The processing module is configured to calculate a measurement moment of cell handover based on a measurement event, where the measurement event is a location relationship between a terminal and the network device. The sending module is configured to send a measurement indication, where the measurement indication carries the measurement moment, and the measurement indication is used to indicate the terminal to perform cell handover measurement. The network device calculates the measurement moment of the cell handover based on the location relationship between the terminal and the network device, and indicates the terminal to perform the cell handover measurement at the measurement moment. Therefore, in the cell handover measurement indication method in this embodiment of this application, the network device calculates the measurement moment based on the location relationship, and the terminal performs the cell handover measurement based on the measurement moment. The network device and the terminal simultaneously participate in cell handover decision making, and this can effectively improve reliability and real-time performance of cell handover.

The modules included in the network device in the sixth aspect may be configured to perform steps described in various implementations of the cell handover measurement indication method in the first aspect. For details, refer to the description of the various implementations of the cell handover measurement indication method in the first aspect. For specific description of the modules, refer to related description in the first aspect. Details are not described herein again.

According to a seventh aspect, an embodiment of this application provides a terminal, including: a receiving module and a processing module. The receiving module is configured to receive a measurement indication, where the measurement indication is used to indicate the terminal to perform cell handover measurement, the measurement indication carries a measurement moment of cell handover, the measurement moment is obtained by a network device through calculation based on a measurement event, and the measurement event is a location relationship between the terminal and the network device. The processing module is configured to perform the cell handover measurement based on the measurement indication.

The modules included in the terminal in the seventh aspect may be configured to perform steps described in various implementations of the cell handover measurement indication method in the second aspect. For details, refer to the description of the various implementations of the cell handover measurement indication method in the second aspect. For specific description of the modules, refer to related description in the second aspect. Details are not described herein again.

According to an eighth aspect, an embodiment of this application provides a network device, including: a sending module, configured to send a measurement indication, where the measurement indication is used to indicate a terminal to perform cell handover measurement, the measurement indication carries a measurement moment of cell handover, and the measurement moment may be obtained by the network device through calculation based on a measurement event determined based on a location relationship between the terminal and the network device.

The modules included in the network device in the eighth aspect may be configured to perform steps described in various implementations of the cell handover measurement indication method in the third aspect. For details, refer to the description of the various implementations of the cell handover measurement indication method in the third aspect. For specific description of the modules, refer to related description in the third aspect. Details are not described herein again.

According to a ninth aspect, an embodiment of this application provides a terminal, including: a receiving module, configured to receive a measurement indication, where the measurement indication is used to indicate the terminal to perform cell handover measurement, the measurement indication carries a measurement moment of cell handover, the measurement moment is obtained through calculation based on a measurement event, and the measurement event is a location relationship between the terminal and a network device.

The modules included in the terminal in the ninth aspect may be configured to perform steps described in various implementations of the cell handover measurement indication method in the fourth aspect. For details, refer to the description of the various implementations of the cell handover measurement indication method in the fourth aspect. For specific description of the modules, refer to related description in the fourth aspect. Details are not described herein again.

According to a tenth aspect, an embodiment of this application provides a terminal, including: a processing module, configured to calculate a measurement moment of cell handover based on a measurement event, where the measurement event is a location relationship between the terminal and a network device; and further configured to perform cell handover measurement based on the measurement moment.

The modules included in the terminal in the tenth aspect may be configured to perform steps described in various implementations of the cell handover measurement indication method in the fifth aspect. For details, refer to the description of the various implementations of the cell handover measurement indication method in the first aspect. For specific description of the modules, refer to related description in the first aspect. Details are not described herein again.

According to an eleventh aspect, an embodiment of this application provides an apparatus, where the apparatus may be an entity such as a network device or a chip, and the apparatus includes a processor. The processor is configured to execute instructions in a memory, so that the apparatus performs the method according to the first aspect or the third aspect. The memory may be disposed outside or inside the apparatus.

According to a twelfth aspect, an embodiment of this application provides an apparatus, where the apparatus may be an entity such as a terminal or a chip, and the apparatus includes a processor. The processor is configured to execute instructions in a memory, so that the apparatus performs the method according to the second aspect, the fourth aspect, or the fifth aspect. The memory may be disposed outside or inside the apparatus.

According to a thirteenth aspect, an embodiment of this application provides a computer readable storage medium. The computer readable storage medium stores instructions, and when the instructions are run on a computer, the computer is enabled to perform the method according to any one of the first aspect to the fifth aspect.

According to a fourteenth aspect, an embodiment of this application provides a computer program product including instructions, and when the instructions are run on a computer, the computer is enabled to perform the method according to any one of the first aspect to the fifth aspect.

According to a fifteenth aspect, this application provides a chip system. The chip system includes a processor, configured to support a network device in implementing functions in the first aspect or the third aspect, or configured to support a terminal in implementing functions in the second aspect, the fourth aspect, or the fifth aspect, for example, sending or processing data and/or information in the above method. In a possible design, the chip system further includes a memory. The memory is configured to store program instructions and data that are necessary for the network device or the terminal. The chip system may include a chip, or may include a chip and another discrete device. The chip system may further include an interface configured to transmit and receive data.

DESCRIPTION OF EMBODIMENTS

Figure 1:
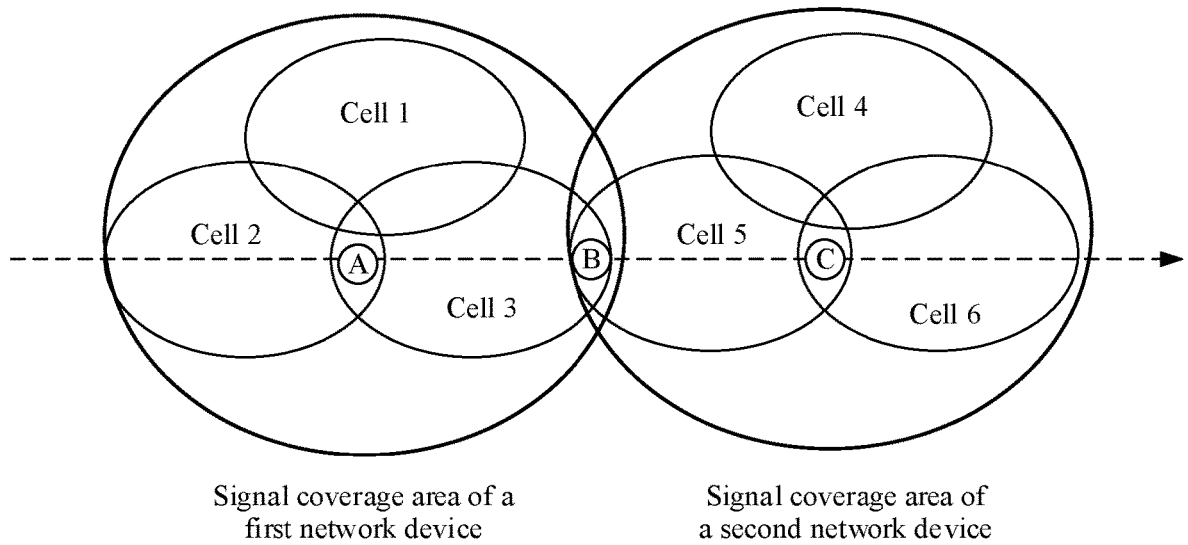
FIG. 1 is a schematic structural diagram of a communication system to which a cell handover measurement indication method is applicable according to an embodiment of this application.

Embodiments of this application provide a cell handover measurement indication method, a network device, and a terminal, to improve reliability and real-time performance of cell handover.

The following describes the cell handover measurement indication method, the network device, and the terminal provided in the embodiments of this application with reference to the accompanying drawings.

For ease of understanding technical solutions in the embodiments of this application, before the cell handover measurement indication method, the network device, and the terminal provided in the embodiments of this application are described, related terms, applicable communication systems, the network device, and the terminal in this application are first described.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of this application. Sometimes "first" and "second" may be the same or different. In addition, the terms "include", "comprise" and any other variants mean to cover the non-exclusive inclusion, so that a process, method, system, product, or device that includes a series of units is not necessarily limited to those units, but may include other units not expressly listed or inherent to such a process, method, system, product, or device.

The technical solutions in the embodiments of this application may be applied to various communication systems for data processing, for example, code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are interchangeable. Wireless technologies such as universal terrestrial radio access (UTRA) and CDMA2000 may be implemented in the CDMA system. UTRA may include a wideband CDMA (WCDMA) technology and another variation technology of CDMA. CDMA2000 may cover an interim standard (IS) 2000 (IS-2000), an IS-95 standard, and an IS-856 standard. Wireless technologies such as global system for mobile communications (GSM) may be implemented in the TDMA system. Wireless technologies such as evolved universal terrestrial radio access (E-UTRA), Ultra Mobile Broadband (UMB), IEEE 802.11 (Wi-Fi), IEEE 802.16 (WiMAX), IEEE 802.20, and Flash OFDMA may be implemented in the OFDMA system. UTRA and E-UTRA correspond to UMTS and an evolved UMTS release respectively. 3GPP long term evolution (LTE) and evolved releases based on LTE are new UMTS releases based on E-UTRA. A 5th Generation ("5G" for short) communication system and New Radio ("NR" for short) are next generation communication systems under study. In addition, the communication systems are further applicable to a future-oriented communication technology, and the technical solutions provided in the embodiments of the present disclosure are applicable to the communication systems. The system architecture and the service scenario described in the embodiments of this application are intended to describe the technical solutions in the embodiments of this application more clearly, and do not constitute a limitation on the technical solutions provided in the embodiments of this application. A person of ordinary skill in the art may know that with the evolution of the network architecture and the emergence of new service scenarios, the technical solutions provided in the embodiments of this application are also applicable to similar technical problems.

FIG. 1 shows a schematic structural diagram of a communication system to which a cell handover measurement indication method is applicable according to an embodiment of this application. As shown in FIG. 1, areas delineated by black bold lines are respectively a signal coverage area of a first network device and a signal coverage area of a second network device. The signal coverage area of the first network device includes a cell 1, a cell 2, and a cell 3, and the signal coverage area of the second network device includes a cell 4, a cell 5, and a cell 6. It is assumed that a terminal moves along a path shown by a dashed line arrow in FIG. 1. In a moving process of the terminal, to ensure signal quality of the terminal, the terminal needs to be continuously handed over between various cells. Specifically, when the terminal moves to an overlapping signal coverage area of the cell 2 and the cell 3, namely, a point A in FIG. 1, the terminal needs to be handed over from the cell 2 to the cell 3. Because the cell 2 and the cell 3 both belong to the signal coverage area of the first network device, handover from the cell 2 to the cell 3 is cell handover in a same network device. When the terminal moves to an overlapping signal coverage area of the cell 3 and the cell 5, namely, a point B in FIG. 1, the terminal needs to be handed over from the cell 3 covered by the first network device to the cell 5 in the signal coverage area of the second network device. This is cell handover between different network devices. Similarly, when the terminal moves to an overlapping signal coverage area of the cell 5 and the cell 6, namely, a point C in FIG. 1, the terminal needs to be handed over from the cell 5 to the cell 6. This is cell handover in the second network device. The cell handover measurement indication method in the embodiments of this application is applicable to indicating the two cell handover manners shown in FIG. 1, so as to improve reliability and real-time performance of cell handover.

The communication system shown in FIG. 1 may be a base station access system of a 2G network (to be specific, the RAN includes a base station and a base station controller), or may be a base station access system of a 3G network (to be specific, the RAN includes a base station and an RNC), or may be a base station access system of a 4G network (to be specific, the RAN includes an eNB and an RNC), or may be a base station access system of a 5G network. The RAN includes one or more network devices. The network device may be any device with a wireless transmitting and receiving function, or a chip disposed in a specific device with a wireless transmitting and receiving function. The network device includes but is not limited to a base station (for example, a base station (BS), a NodeB (NB), an evolved NodeB (eNB), a gNodeB (gNB) in a fifth generation 5G communication system, a base station in a future communication system, or an access node, a wireless relay node, or a wireless backhaul node in a Wi-Fi system). The base station may be a macro base station, a micro base station, a picocell base station, a small cell, a relay station, or the like. A plurality of base stations may support networks of one or more technologies mentioned above, or a future evolved network. A core network may support networks of one or more technologies mentioned above, or a future evolved network. The base station may include one or more co-sited or non-co-sited transmission reception points (TRP). Alternatively, the network device may be a radio controller, a centralized unit (CU), or a distributed unit (DU) in a cloud radio access network (CRAN) scenario. Alternatively, the network device may be a server, a wearable device, a vehicle-mounted device, or the like. The following provides description by using an example in which the network device is a base station. The plurality of network devices may be base stations of a same type, or may be base stations of different types. The base station may communicate with terminal devices 1 to 6, or may communicate with terminal devices 1 to 6 by using a relay station. The terminal devices 1 to 6 may support communication with a plurality of base stations of different technologies. For example, the terminal device may support communication with a base station supporting an LTE network, or may support communication with a base station supporting a 5G network, or may further support dual connections to a base station in the LTE network and a base station in the 5G network. For example, the terminal is connected to a RAN node in a wireless network. Currently, some RAN nodes are, for example, a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home Node B, HNB), a baseband unit (BBU), or a wireless fidelity (Wi-fi) access point (AP). In a network structure, the network device may include a centralized unit (CU) node, or a distributed unit (DU) node, or a RAN device including a CU node and a DU node.

FIG. 1 is described by using satellite communication as an example, and certainly may be used in another communication system. Alternatively, the communication system shown in FIG. 1 may be a mobile satellite communication system in satellite communication, and in the mobile satellite communication system, the network device includes but is not limited to a non-geostationary earth orbit (NGEO) communication satellite, a device having a wireless transmitting and receiving function in the NGEO communication satellite, or a chip disposed in a specific device having a wireless transmitting and receiving function in the NGEO communication satellite.

The terminal in this embodiment of this application is also referred to as user equipment (UE), a mobile station (MS), a mobile terminal (MT), a terminal device, or the like, and is a device that provides voice and/or data connectivity for a user, or a chip disposed in the device, for example, a handheld device allowed by wireless connection power, or a vehicle-mounted device. The terminal may include but is not limited to a handheld device having a wireless communication function, a vehicle-mounted device, a wearable device, a computing device, another processing device connected to a wireless modem, a mobile phone (mobile phone), a tablet computer, a notebook computer, a palmtop computer, a mobile Internet device (MID), a machine type communication terminal, a virtual reality (VR) device, an augmented reality (AR) device, a wireless terminal in industrial control, a wireless terminal in self driving, a wireless terminal in remote medical surgery, a wireless terminal in smart grid, a wireless terminal in transportation safety, a wireless terminal in a smart city, a wireless terminal in a smart home, and the like.

Figure 2:
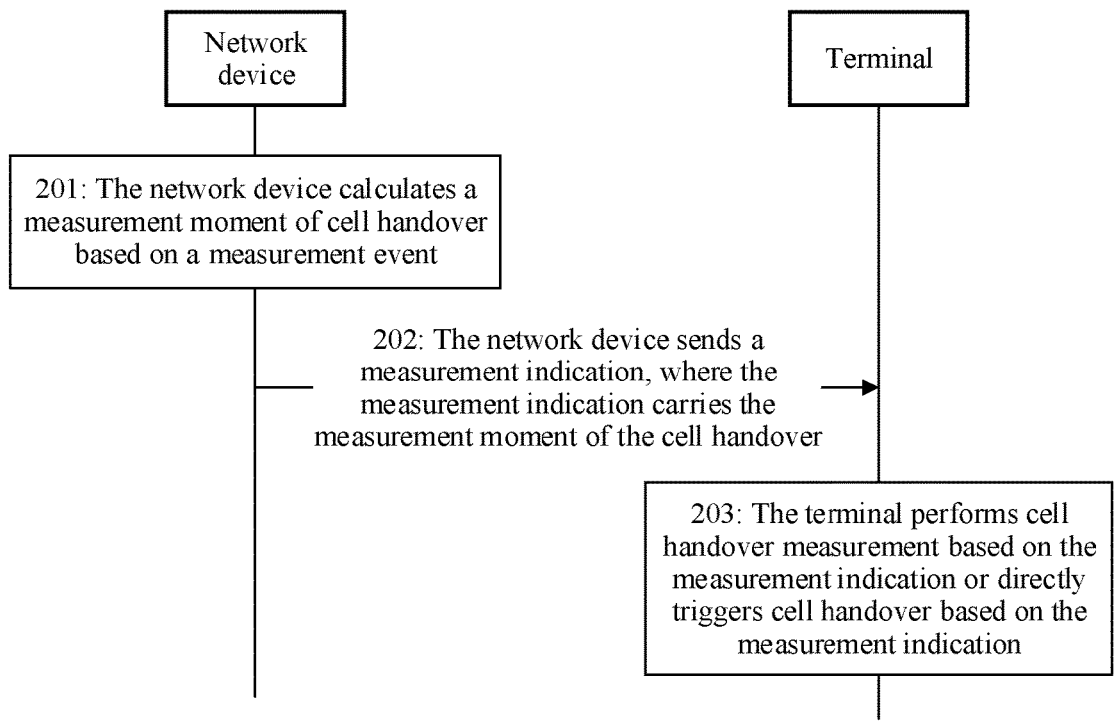
FIG. 2 is a schematic diagram of an embodiment of a cell handover measurement indication method according to an embodiment of this application.

The following describes in detail a cell handover measurement indication method in an embodiment of this application with reference to the accompanying drawings. FIG. 2 is a schematic diagram of an embodiment of a cell handover measurement indication method according to an embodiment of this application.

As shown in FIG. 2, an embodiment of cell handover measurement indication in this embodiment of this application includes:

201: A network device calculates a measurement moment of cell handover based on a measurement event.

The measurement event is a location relationship between a terminal and the network device. Specifically, the measurement event may include one of a first measurement event or a second measurement event. The first measurement event may be that a distance between the terminal and a center point of a serving cell is greater than a first threshold. The second measurement event may be that a distance between the terminal and the network device is greater than a second threshold.

Specifically, in a mobile satellite communication system, the first measurement event may be specifically that a distance between the terminal and a beam center point is greater than the first threshold, and the second measurement event may be specifically that a distance between the terminal and a ground mapping point of a communication satellite is greater than the second threshold. Optionally, the communication satellite performs calculation based on the first threshold, location information of the center point of the serving cell, and a signal coverage area of the serving cell, to obtain a handover point location corresponding to the cell; and the communication satellite obtains the measurement moment of the cell handover through calculation based on the handover point location and a moving speed of the communication satellite. Optionally, the first threshold may be determined based on at least one of a delay of handover between cells covered by a same communication satellite, a cell diameter corresponding to the serving cell, an orbit height of the communication satellite, a motion speed of the communication satellite, or a service type of the terminal. The second threshold may be determined based on at least one of a delay of handover between cells covered by different communication satellites, a cell diameter corresponding to the serving cell, an orbit height of the communication satellite, a motion speed of the communication satellite, or a service type of the terminal. It should be understood that the first measurement event is applicable to cell handover between cells in a coverage area of a same communication satellite, where the cell handover may also be referred to as intra-satellite handover. The second measurement event is applicable to cell handover between cells in coverage areas of different communication satellites, where the cell handover may also be referred to as inter-satellite handover.

In a base station access system, the first measurement event may be specifically that the distance between the terminal and the center point of the serving cell is greater than the first threshold, and the second measurement event may be specifically that a distance between the terminal and a base station is greater than the second threshold. Optionally, the base station may perform calculation based on the first threshold, location information of the center point of the serving cell, and a signal coverage area of the serving cell, to obtain a handover point location corresponding to the cell. Finally, the base station obtains the measurement moment of the cell handover through calculation based on the handover point location corresponding to the cell. Optionally, the first threshold may be determined based on at least one of a delay of handover between cells covered by a same base station, a cell diameter corresponding to the serving cell, or a service type of the terminal. Similarly, the second threshold may be determined based on at least one of a delay of handover between cells covered by different base stations, a cell diameter corresponding to the serving cell, or a service type of the terminal. It should be understood that the first measurement event is applicable to cell handover between cells in a coverage area of a same base station, and the second measurement event is applicable to cell handover between cells in coverage areas of different communication satellites.

Optionally, the location information may include but is not limited to latitude and longitude information.

It should be noted that, because a coverage area of a cell is usually an ellipse other than a circle, the cell diameter may be determined based on a semi-major axis and a semi-minor axis of the elliptical coverage area of the cell, or may be obtained after the coverage area of the cell is approximate to a circle.

In an implementation, the first threshold and/or the second threshold may be dynamically changed, to adapt to cell handover requirements of terminals of different service types or in different scenarios.

Specifically, in a low earth orbit (LEO) scenario in the mobile satellite communication system, a threshold may be appropriately increased when the motion speed of the satellite becomes slower as the orbit height becomes higher, and the threshold increases when the cell diameter becomes larger at a same orbit height. Optionally, for the LEO scenario, both the first threshold and the second threshold may be configured by using, but not limited to, thresholds in Table 1.

TABLE 1

| LEO scenario | First threshold and second threshold |
| --- | --- |
| LEO (an orbit height: 600 km; a cell diameter: 200 km) | 170 (km) |
| LEO (an orbit height: 1200 km; a cell diameter: 200 km) | 185 (km) |
| LEO (an orbit height: 600 km; a cell diameter: 500 km) | 450 (km) |
| LEO (an orbit height: 1200 km; a cell diameter: 500 km) | 475 (km) |
| ... | ... |

In addition, different first thresholds and/or second thresholds may be set for terminals of different service types, so as to adjust measurement times of the terminals. For example, a threshold of an Internet of Things (IoT) device may be relatively large, to reduce a measurement time of the terminal, thereby saving energy overheads. A threshold of a mobile device needs to be reduced, to reduce uncertainty caused by motion of the UE. For terminals of different service types, both the first threshold and the second threshold may be configured by using, but not limited to, thresholds in Table 2.

TABLE 2

| Terminal type | First threshold and second threshold (R is a cell diameter) |
| --- | --- |
| IoT device | 0.95 * R |
| Fixed access device | 0.9 * R |
| Mobile device | 0.8 * R |
| ... | ... |

202: The network device sends a measurement indication, where the measurement indication carries the measurement moment of the cell handover.

The measurement moment of the cell handover includes but is not limited to at least one of a measurement start moment, a measurement end moment, or a time offset, where the time offset is a time difference between the measurement start moment and the measurement end moment. Specifically, the measurement moment may include the measurement start moment and the measurement end moment, or may include the measurement start moment and the time offset.

Optionally, the network device may send the measurement indication by using, but not limited to, a radio resource control message or downlink control information. In other words, the measurement indication that carries the measurement moment is carried in the radio resource control message or the downlink control information for sending. It should be noted that, the measurement indication may be periodically sent according to a specific period, to update the measurement moment in a timely manner. A value of the period may be determined based on a motion status of the terminal, a service type of the terminal, and the like. This is not limited herein.

Specifically, when the measurement moment may include the measurement start moment and the measurement end moment, the network device may add the measurement start moment and the measurement end moment to the radio resource control message or the downlink control information, and send the radio resource control message or the downlink control information to the terminal. Alternatively, when the measurement moment may include the measurement start moment and the time offset, the network device may add the measurement start moment and the time offset to the radio resource control message or the downlink control information, and send the radio resource control message or the downlink control information to the terminal. It should be noted that the measurement indication may be further sent by using another message other than the radio resource control message or the downlink control information. This is not limited in this application.

Optionally, the network device may send the measurement indication in a manner of reusing a field or adding a new field.

Optionally, the measurement indication may further include indication information that indicates the terminal to enable or disable measurement. Alternatively, the indication information that indicates the terminal to enable or disable measurement may be sent separately. This is not limited in this application.

Specifically, the network device may reuse an existing field in the radio resource control message or the downlink control information to send the measurement indication, or the network device may add a new field to the radio resource control message or the downlink control information to send the measurement indication, where the newly added field may use a reserved field in the radio resource control message or the downlink control message.

An example in which a new field is added to the radio resource control message is used, and the measurement indication may be sent by using the following two implementations.

In a first implementation, the base station or the communication satellite may add a corresponding field to a measurement configuration information element MeasConfig information element carried in the radio resource control (RRC) message transmitted in the system, and send the measurement start moment and the measurement end moment to the terminal. Optionally, the RRC message is typically an RRC reconfiguration message. Optionally, a quantity of bits that may be occupied by the measurement start moment in the RRC message includes but is not limited to 32 bits, and a quantity of bits that may be occupied by the measurement end moment in the RRC message also includes but is not limited to 32 bits.

In a second implementation, the base station or the communication satellite may add a corresponding field to a measurement configuration information element MeasConfig information element carried in the radio resource control (RRC) message transmitted in the system, and send the measurement start moment and the time offset to the terminal. Optionally, a quantity of bits that may be occupied by the measurement start moment in the RRC message includes but is not limited to 32 bits, and a quantity of bits that may be occupied by the time offset in the RRC message includes but is not limited to 12 bits. This manner is applicable to a scenario in which the height of the communication satellite ranges from 600 km to 1500 km, a minimum speed is 7 km/s, and a typical value of the corresponding cell diameter is 200 km. In this case, a maximum residence time of the terminal in the cell is about 30 s, and time precision of 10 ms is adopted. Therefore, a maximum time offset is 3000, so that 12 bits are used to represent the time offset. It should be noted that the RRC message is one of radio resource control messages.

The measurement indication sent by using the first implementation or the second implementation may further carry the indication information that indicates the terminal to enable or disable measurement.

Specifically, a corresponding field is added to the measurement configuration information element MeasConfig information element carried in the RRC message, to send the measurement start moment and the time offset to the terminal, or send the measurement start moment and the measurement end moment to the terminal. In addition, a corresponding field is further added to the measurement configuration information element MeasConfig information element, to send, to the terminal, the indication information that indicates the terminal to enable or disable measurement. For example, a new bit is added to indicate the terminal to enable or disable measurement, when the bit is 1, the terminal is indicated to enable measurement, and when the bit is 0, the terminal is indicated to disable measurement.

The indication information that indicates the terminal to enable or disable measurement may be further sent in a manner of adding a new field to the downlink control information. Specifically, any one bit may be added to original downlink control information fields of a signal broadcast by the satellite or the base station, and used as the indication information for enabling or disabling measurement. When the bit is 1, the terminal is indicated to enable measurement, and when the bit is 0, the terminal is indicated to disable measurement.

Optionally, the measurement indication may include the measurement moment of one or more cells, where the one or more cells include the serving cell, and a plurality of cells mean two or more cells.

Specifically, in a base station scenario, the plurality of cells may be cells corresponding to a same base station, and/or cells corresponding to different base stations. Similarly, in a communication satellite scenario, the plurality of cells may be cells corresponding to a same communication satellite, or cells corresponding to different communication satellites.

203: The terminal performs cell handover measurement based on the measurement indication or directly triggers cell handover based on the measurement indication.

The terminal determines, based on the measurement indication, the measurement start moment and the measurement end moment corresponding to the cell, and further, the terminal may perform the cell handover measurement based on the measurement start moment and the measurement end moment corresponding to the cell, or the terminal may directly trigger cell handover based on any moment between the measurement start moment and the measurement end moment corresponding to the cell, to execute a corresponding cell handover procedure.

Specifically, when the measurement start moment corresponding to the cell is reached, the terminal enables the cell handover measurement, for example, triggering at least one of existing new radio (new radio, NR) measurement events A1 to A6 and B1 to B2. When the measurement disabling time corresponding to the cell is reached, the terminal may disable the NR measurement event that is enabled at the measurement start moment, or the terminal may delay, based on an actual situation, disabling the NR measurement event that is enabled at the measurement start moment. For related description of the NR measurement events A1 to A6 and B1 to B2, refer to related documents. Details are not described herein again.

In this embodiment of this application, the network device calculates the measurement moment of the cell handover based on the location relationship between the terminal and the network device, and indicates the terminal to perform the cell handover measurement at the measurement moment. It is easily understood that, in the cell handover measurement indication method in this embodiment of this application, the network device calculates the measurement moment based on the location relationship, and the terminal performs the cell handover measurement based on the measurement moment. The network device and the terminal simultaneously participate in cell handover decision making, and this can effectively improve reliability and real-time performance of cell handover.

Figure 3:
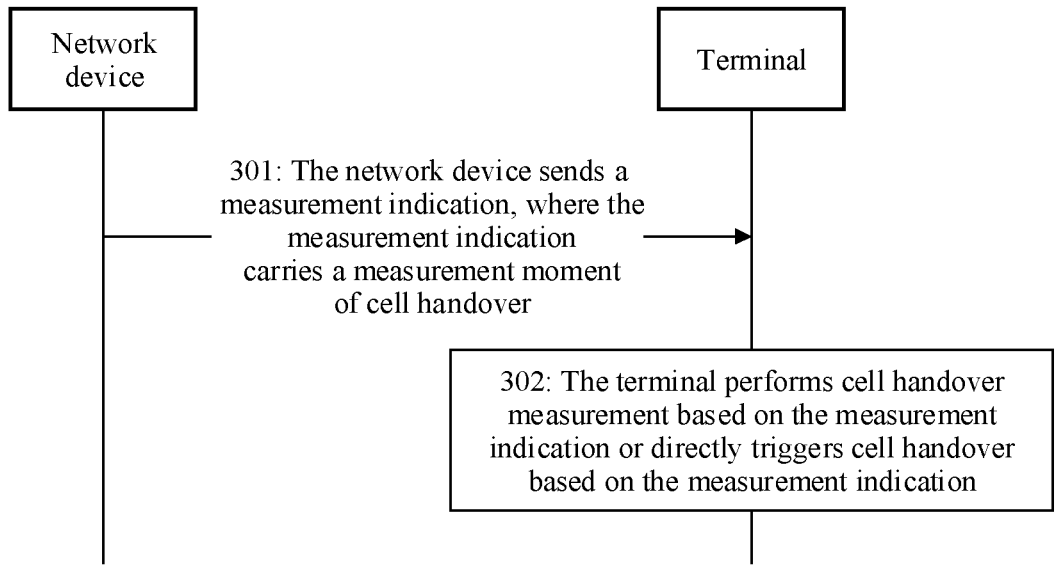
FIG. 3 is a schematic diagram of another embodiment of a cell handover measurement indication method according to an embodiment of this application.

FIG. 3 is a schematic diagram of another embodiment of a cell handover measurement indication method according to an embodiment of this application.

As shown in FIG. 3, another embodiment of cell handover measurement indication in this embodiment of this application includes:

301: A network device sends a measurement indication, where the measurement indication carries a measurement moment of cell handover.

302: A terminal performs cell handover measurement based on the measurement indication or directly triggers cell handover based on the measurement indication.

Steps 301 and 302 are respectively similar to the foregoing steps 202 and 203. For description of step 301, refer to the description of the foregoing step 202. For description of step 302, refer to the description of the foregoing step 203. Details are not described herein again.

A corresponding beneficial effect in this embodiment of this application is also similar to that in the embodiment corresponding to FIG. 2, and details are not described herein again.

A mobile satellite communication system scenario is used as an example to describe in detail a possible calculation manner of a corresponding measurement moment based on a measurement event:

1. Calculating the Measurement Moment Based on a First Measurement Event Denoted as a Measurement Event C1

Step 1: The network device calculates a first threshold based on a service type of the terminal, a delay of handover between cells in a same communication satellite, and a motion speed of the communication satellite. It is assumed that cell handover is performed between cells covered by a same communication satellite, an average delay required from a time at which the terminal sends a handover request to a time at which cell handover processing is completed is t1, a moving speed of the satellite is v, and a cell diameter is R. In this case, the first threshold TH1 may be (R−v*t1). According to different terminal service types in Table 2, if the terminal is an IoT device, the first threshold TH1 may be (0.95*R−v*t1); if the terminal is a fixed access device, the first threshold TH1 may be (0.9*R−v*t1); if the terminal is a mobile device, the first threshold TH1 may be (0.9*R−v*t1).

Step 2: Calculate, based on the first threshold by using a first calculation formula, longitude and latitude locations ($long_{ho}$, $lat_{ho}$) of handover points corresponding to one or more cells.

The first calculation formula is $$\sqrt{\left(\frac{lat_{ho} - lat_{bc}}{a_c}\right)^2 + \left(\frac{long_{ho} - long_{bc}}{b_c}\right)^2} = TH1,$$

where $long_{bc}$ is a longitude location of a beam center point, $lat_{bc}$ is a latitude location of the beam center point, $a_c$ is a semi-major axis length of a coverage area of a cell, and $b_c$ is a semi-minor axis length of the coverage area of the cell.

It should be noted that, a signal coverage area corresponding to a case in which a distance between the terminal and the beam center point is greater than the first threshold is a protected area, and cell handover measurement needs to be performed when the terminal is located in the protected area; a signal coverage area corresponding to a case in which a distance between the terminal and the beam center point is not greater than the first threshold is a non-protected area, and there is no need to perform cell handover measurement when the terminal is located in the non-protected area.

Step 3: Calculate, based on initial locations ($long_u$, $lat_u$) of the terminal, an initial moment Tu, longitude and latitude locations ($long_{ho}$, $lat_{ho}$) of a handover point, and the moving speed v of the satellite by using a second calculation formula, a moment t_meas corresponding to the handover point.

The second calculation formula is $$\text{t\_meas} = T_u + \frac{1}{v} * \sqrt{(lat_{ho} - lat_u)^2 + (long_{ho} - long_u)^2}.$$

2. Calculating the Measurement Moment Based on a Second Measurement Event Denoted as a Measurement Event C2.

Step 1: The network device calculates a second threshold based on a service type of the terminal, a delay of handover between cells in different communication satellites, and a motion speed of a communication satellite. It is assumed that cell handover is performed between cells covered by different communication satellites, an average delay required from a time at which the terminal sends a handover request to a time at which cell handover processing is completed is t2, a moving speed of the satellite is v, and a cell diameter is R, the second threshold TH2 may be (R−v*t2). According to different terminal service types in Table 2, if the terminal is an IoT device, the second threshold TH2 may be (0.95R−v*t2); if the terminal is a fixed access device, the second threshold TH2 may be (0.9*R−v*t2); if the terminal is a mobile device, the second threshold TH2 may be (0.9*R−v*t2).

Step 2: Calculate, based on the second threshold by using a third calculation formula, longitude and latitude locations ($long_{ho}$, $lat_{ho}$) of handover points corresponding to one or more cells.

The third calculation formula is $$\sqrt{\left(\frac{lat_{ho} - lat_{bc}}{a_c}\right)^2 + \left(\frac{long_{ho} - long_{bc}}{b_c}\right)^2} = TH2,$$

where $long_{sc}$ is a longitude location of a ground mapping point of a communications satellite, $lat_{sc}$ is a latitude location of a ground mapping point of a communication satellite, $a_s$ is a semi-major axis length of a coverage area of the communication satellite, and $b_c$ is a semi-minor axis length of the coverage area of the communication satellite.

Similarly, it should be noted that, a signal coverage area corresponding to a case in which a distance between the terminal and the ground mapping point of the communication satellite is greater than the second threshold is a protected area, and cell handover measurement needs to be performed when the terminal is located in the protected area; a signal coverage area corresponding to a case in which a distance between the terminal and the ground mapping point of the communication satellite is not greater than the second threshold is a non-protected area, and there is no need to perform cell handover measurement when the terminal is located in the non-protected area.

Step 3: Calculate, based on initial locations ($long_u$, $lat_u$) of the terminal, an initial moment Tu, longitude and latitude locations ($long_{ho}$, $lat_{ho}$) of a handover point, and the moving speed v of the satellite by using a second calculation formula, a moment t_meas corresponding to the handover point.

The second calculation formula is $$\text{t\_meas} = T_u + \frac{1}{v} * \sqrt{(lat_{ho} - lat_u)^2 + (long_{ho} - long_u)^2}.$$

It should be further noted that, for a calculation manner based on a measurement event in a scenario in which a base station accesses the system, reference may be made to the foregoing calculation manner based on a measurement event in the mobile satellite communication system scenario and corresponding transformation is performed. Details are not described herein again.

Two implementations of the cell handover measurement indication method provided in the embodiments of this application are respectively described in detail in FIG. 2 and FIG. 3. The following describes in detail an embodiment in which a terminal or a network device makes a cell handover decision based on indication manners in FIG. 4 and FIG. 5.

1. Cell Handover Manner in which a Terminal Makes a Cell Handover Decision Based on the Cell Handover Measurement Indication Method.

Figure 4:
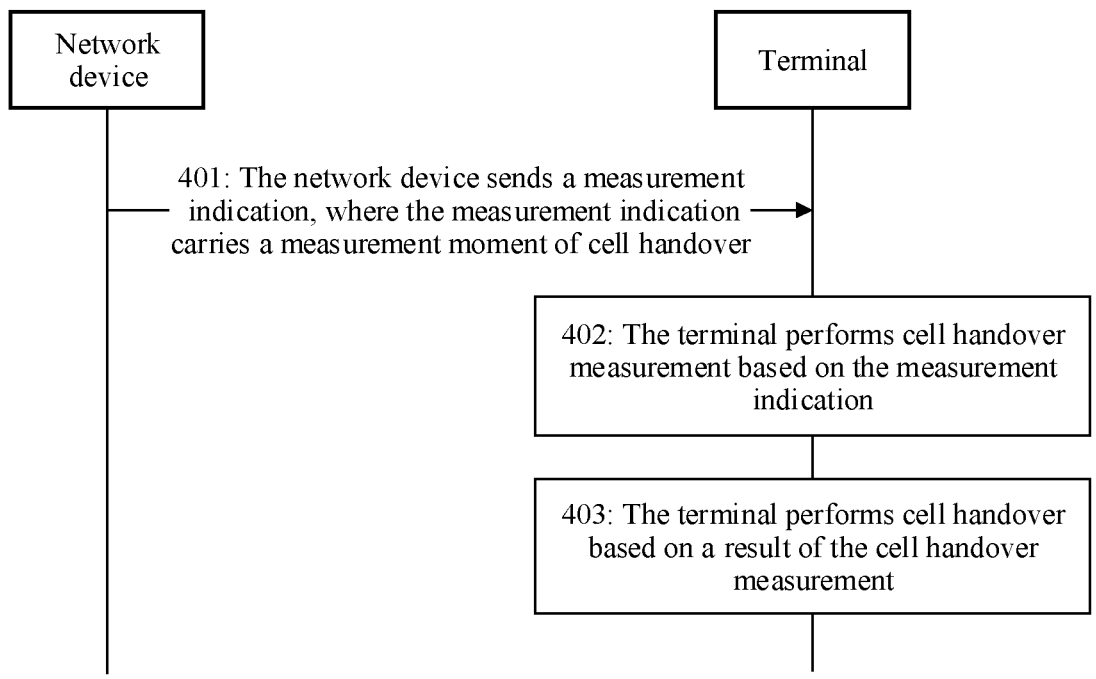
FIG. 4 is a schematic diagram of an embodiment in which a terminal makes a cell handover decision according to an embodiment of this application.

FIG. 4 is a schematic diagram of an embodiment in which a terminal makes a cell handover decision according to an embodiment of this application.

401: A network device sends a measurement indication, where the measurement indication carries a measurement moment of cell handover.

402: A terminal performs cell handover measurement based on the measurement indication.

Steps 401 and 402 are respectively similar to the foregoing steps 202 and 203. For description of step 401, refer to the description of the foregoing step 202. For description of step 402, refer to the description of the foregoing step 203. Details are not described herein again.

403: The terminal performs cell handover based on a result of the cell handover measurement.

When a measurement event is a first measurement event, that the terminal performs cell handover based on a result of the cell handover measurement includes: the terminal initiates a cell handover procedure, or the terminal skips initiating a cell handover procedure.

Specifically, if the result of the cell handover measurement indicates that cell handover needs to be performed, the terminal determines, based on the result of the cell handover measurement, that another cell with relatively high signal strength under coverage of a same communication satellite or a same base station is a target cell, and initiates a cell handover request to the target cell, so that the terminal is handed over to the target cell. Otherwise, the terminal does not initiate the cell handover procedure.

When a measurement event is a second measurement event, that the terminal performs cell handover based on a result of the cell handover measurement includes: the terminal initiates a cell handover procedure, or the terminal skips initiating a cell handover procedure.

Specifically, if the result of the cell handover measurement indicates that cell handover needs to be performed, the terminal initiates a cell handover request to a new base station or a new communication satellite based on the result of the cell handover measurement, so that the terminal is handed over to the new base station or the new communication satellite. Otherwise, the terminal does not initiate the cell handover procedure.

2. Cell Handover Manner in which a Network Device Makes a Cell Handover Decision Based on the Cell Handover Measurement Indication Method.

Figure 5:
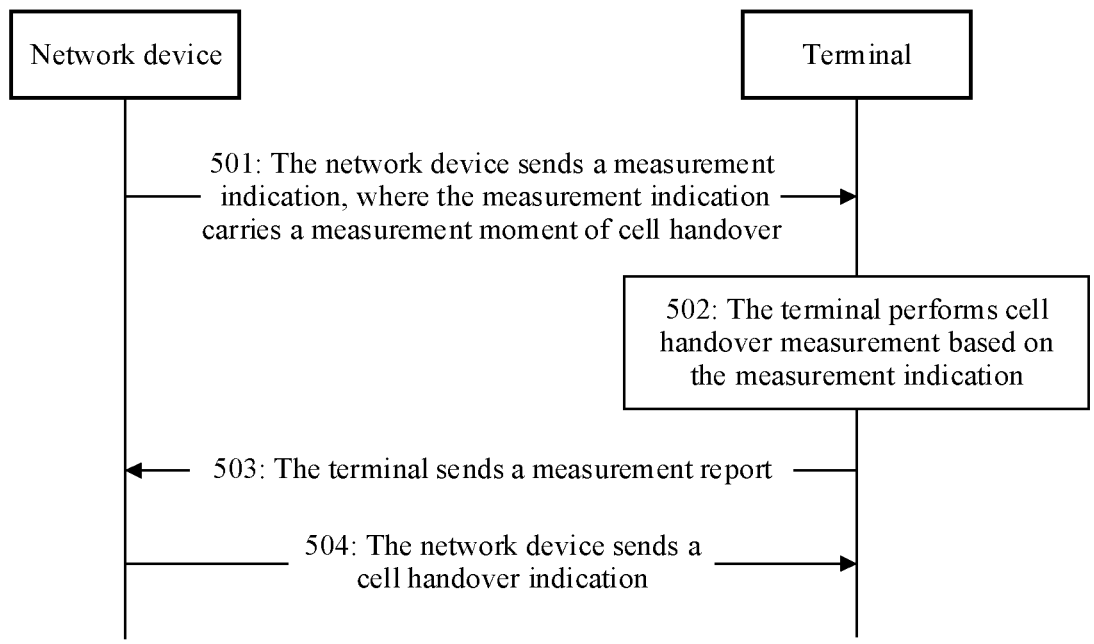
FIG. 5 is a schematic diagram of an embodiment in which a network device makes a cell handover decision according to an embodiment of this application.

FIG. 5 is a schematic diagram of an embodiment in which a network device makes a cell handover decision according to an embodiment of this application.

501: A network device sends a measurement indication, where the measurement indication carries a measurement moment of cell handover.

502: A terminal performs cell handover measurement based on the measurement indication.

Steps 501 and 502 are respectively similar to the foregoing steps 202 and 203. For description of step 501, refer to the description of the foregoing step 202. For description of step 502, refer to the description of the foregoing step 203. Details are not described herein again.

503: The terminal sends a measurement report.

504: The network device sends a cell handover indication.

The network device makes a cell handover decision based on the measurement report. If it is determined that cell handover needs to be performed, the network device sends, to the terminal, a cell handover indication that indicates the terminal to perform cell handover. Otherwise, the network device sends, to the terminal, a cell handover indication that indicates the terminal not to perform cell handover.

In the embodiments corresponding to the indication methods in FIG. 2 to FIG. 5, a calculation process of a measurement moment is implemented on the network device side. Actually, the calculation process of the measurement moment may also be implemented on the terminal side. The following performs description in detail.

Figure 6:
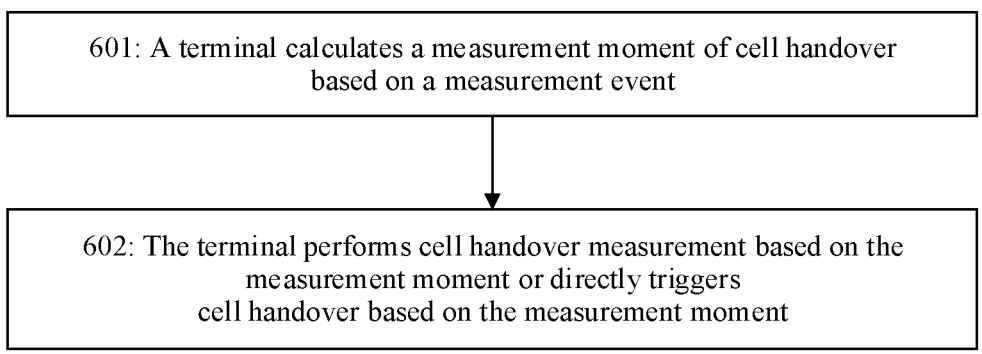
FIG. 6 is a flowchart of an embodiment in which a terminal calculates a measurement moment according to an embodiment of this application.

FIG. 6 is a flowchart of an embodiment in which a terminal calculates a measurement moment according to an embodiment of this application.

601: A terminal calculates a measurement moment of cell handover based on a measurement event.

A manner in which the terminal calculates the measurement moment of the cell handover based on the measurement event in step 601 is the same as a manner in which a network device calculates a measurement moment of cell handover based on a measurement event in step 201, and details are not described herein again.

It should be noted that, different from the foregoing calculation performed on the network device side, the terminal needs to learn in advance network side information related to the measurement moment of the cell handover. Specifically, before step 601, the method further includes: the terminal receives the network side information that is sent by the network device and that is related to the measurement moment of the cell handover.

602: The terminal performs cell handover measurement based on the measurement moment or directly triggers cell handover based on the measurement moment.

Step 602 is similar to step 203. For description of step 602, refer to the description in step 203. Details are not described herein again.

It should be noted that, a specific cell handover procedure and a cell handover operation mentioned in this embodiment of this application are consistent with a conventional cell handover procedure and cell handover operation. For the specific cell handover procedure and cell handover operation, refer to related documents. Details are not described in this embodiment of this application.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that the embodiments described in this specification, and the involved actions and modules are not necessarily required by this application.

To better implement the foregoing solutions in the embodiments of this application, the following further provides a related apparatus for implementing the foregoing solutions.

Figure 7:
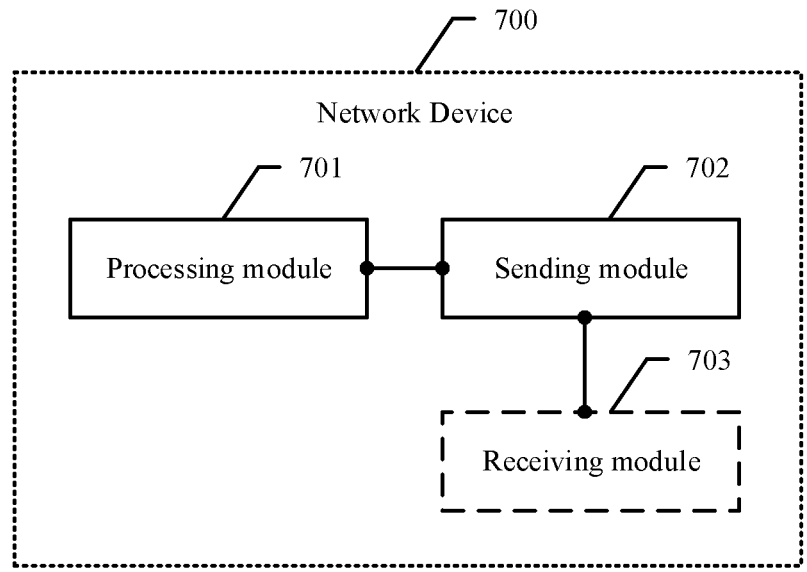
FIG. 7 is a schematic structural diagram of a network device according to an embodiment of this application.

FIG. 7 is a schematic structural diagram of a network device according to an embodiment of this application. A network device 700 includes a processing module 701 and a sending module 702.

The processing module 701 is configured to calculate a measurement moment of cell handover based on a measurement event, where the measurement event is a location relationship between a terminal and the network device.

The sending module 702 is configured to send a measurement indication, where the measurement indication carries the measurement moment, and the measurement indication is used to indicate the terminal to perform cell handover measurement.

In some embodiments of this application, the measurement event includes at least one of the following: a first measurement event or a second measurement event. The first measurement event is that a distance between the terminal and a center point of a serving cell is greater than a first threshold, where the serving cell is a cell that provides a service for the terminal. The second measurement event is that a distance between the terminal and the network device is greater than a second threshold.

In some embodiments of this application, the measurement moment includes at least one of the following: a measurement start moment, a measurement end moment, or a time offset, where the time offset is a time difference between the measurement start moment and the measurement end moment.

In some embodiments of this application, the sending module 702 is specifically configured to send the measurement indication by using a radio resource control message or downlink control information.

In some embodiments of this application, the sending module 702 is specifically configured to send the measurement indication in a manner of reusing a field or adding a new field.

In some embodiments of this application, the measurement indication includes the measurement moment of one or more cells, where the one or more cells include the serving cell.

In some embodiments of this application, when the network device is a communication satellite, the first threshold and/or the second threshold may be determined based on at least one of a first cell handover delay, a cell diameter corresponding to the serving cell, an orbit height of the communication satellite, a motion speed of the communication satellite, or a service type of the terminal, where the first cell handover delay includes a delay of handover between cells covered by a same communication satellite, or a delay of handover between cells covered by different communication satellites.

In some embodiments of this application, when the network device is a base station, the first threshold and/or the second threshold may be determined based on at least one of a second cell handover delay, a cell diameter corresponding to the serving cell, or a service type of the terminal, where the second cell handover delay includes a delay of handover between cells covered by a same base station, or a delay of handover between cells covered by different base stations.

In some embodiments of this application, the network device 700 further includes a receiving module 703, configured to receive a measurement report sent by the terminal, where the measurement report is generated based on a result of the cell handover measurement.

Figure 8:
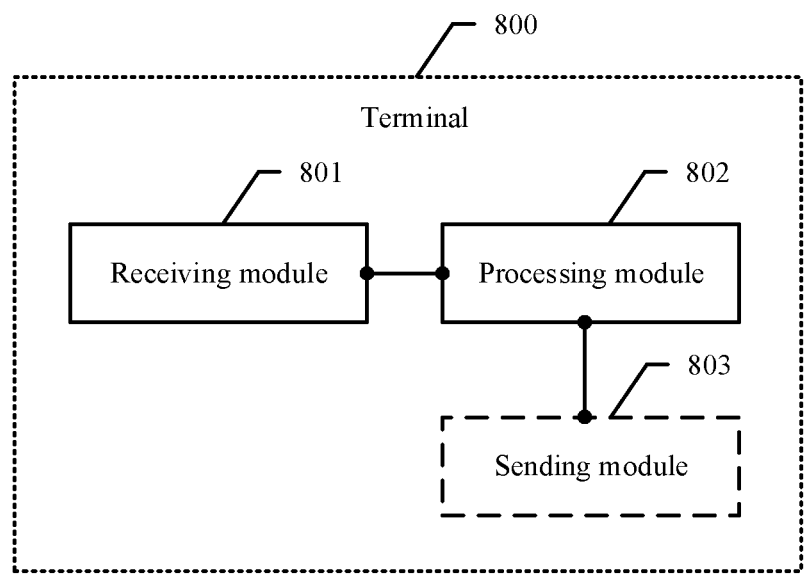
FIG. 8 is a schematic structural diagram of a terminal according to an embodiment of this application.

FIG. 8 is a schematic structural diagram of a terminal according to an embodiment of this application. A terminal 800 includes a receiving module 801 and a processing module 802.

The receiving module 801 is configured to receive a measurement indication, where the measurement indication is used to indicate the terminal to perform cell handover measurement, the measurement indication carries a measurement moment of cell handover, the measurement moment is obtained by a network device through calculation based on a measurement event, and the measurement event is a location relationship between the terminal and the network device.

The processing module 802 is configured to perform the cell handover measurement based on the measurement indication.

In some embodiments of this application, the measurement event includes at least one of the following: a first measurement event or a second measurement event. The first measurement event is that a distance between the terminal and a center point of a serving cell is greater than a first threshold, where the serving cell is a cell that provides a service for the terminal. The second measurement event is that a distance between the terminal and the network device is greater than a second threshold.

In some embodiments of this application, the measurement moment includes at least one of the following: a measurement start moment, a measurement end moment, or a time offset, where the time offset is a time difference between the measurement start moment and the measurement end moment.

In some embodiments of this application, the receiving module 801 is specifically configured to receive the measurement indication by using a radio resource control message or downlink control information.

In some embodiments of this application, the receiving module 801 is specifically configured to receive the measurement indication in a manner of reusing a field or adding a new field.

In some embodiments of this application, the measurement indication includes the measurement moment of one or more cells, where the one or more cells include the serving cell.

In some embodiments of this application, when the network device is a communication satellite, the first threshold and/or the second threshold may be determined based on at least one of a first cell handover delay, a cell diameter corresponding to the serving cell, an orbit height of the communication satellite, a motion speed of the communication satellite, or a service type of the terminal, where the first cell handover delay includes a delay of handover between cells covered by a same communication satellite, or a delay of handover between cells covered by different communication satellites.

In some embodiments of this application, when the network device is a base station, the first threshold and/or the second threshold may be determined based on at least one of a second cell handover delay, a cell diameter corresponding to the serving cell, or a service type of the terminal, where the second cell handover delay includes a delay of handover between cells covered by a same base station, or a delay of handover between cells covered by different base stations.

In some embodiments of this application, the terminal 800 further includes a sending module 803, configured to send a measurement report, where the measurement report is generated based on a result of the cell handover measurement. Alternatively, the processing module 802 is further configured to perform the cell handover based on a result of the cell handover measurement.

It should be noted that content such as information exchange between the modules/units of the apparatus and the execution processes thereof is based on the same idea as the method embodiments of this application, and produces the same technical effects as the method embodiments of this application. For the specific content, refer to the foregoing description in the method embodiments of this application. Details are not described herein again.

An embodiment of this application further provides a computer storage medium. The computer storage medium stores a program, and the program performs some or all of the steps described in the foregoing method embodiments.

Figure 9:
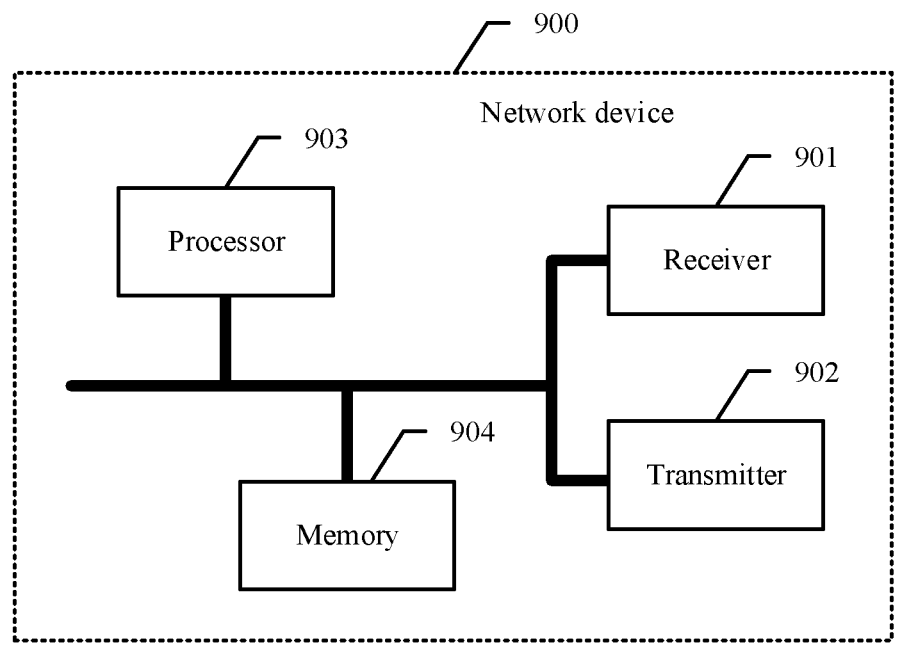
FIG. 9 is a schematic structural diagram of another network device according to an embodiment of this application.

The following describes another network device according to an embodiment of this application. Referring to FIG. 9, a network device 900 includes:

a receiver 901, a transmitter 902, a processor 903, and a memory 904 (where there may be one or more processors 903 in the network device 900, and one processor is used as an example in FIG. 9). In some embodiments of this application, the receiver 901, the transmitter 902, the processor 903, and the memory 904 may be connected by using a bus or in another manner. In FIG. 9, a connection by using the bus is used as an example.

The memory 904 may include a read-only memory and a random access memory, and provide instructions and data to the processor 903. A part of the memory 904 may further include a non-volatile random access memory (NVRAM). The memory 904 stores an operating system and an operation instruction, an executable module or a data structure, or a subset thereof, or an extended set thereof. The operation instruction may include various operation instructions to implement various operations. The operating system may include various system programs to implement various basic services and process hardware-based tasks.

The processor 903 controls an operation of the network device, and the processor 903 may also be referred to as a central processing unit (CPU). In specific application, components of the network device are coupled together by using a bus system. In addition to a data bus, the bus system may further include a power bus, a control bus, and a status signal bus. However, for clear description, various types of buses in the figure are marked as the bus system.

The methods disclosed in the embodiments of this application may be applied to the processor 903, or implemented by the processor 903. The processor 903 may be an integrated circuit chip and has a signal processing capability. In an implementation process, the steps in the foregoing methods can be implemented by using a hardware integrated logical circuit in the processor 903, or by using instructions in a form of software. The processor 903 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor 903 may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly executed and accomplished by using a hardware decoding processor, or may be executed and accomplished by using a combination of hardware and software modules in the decoding processor. The software module may be located in a storage medium mature in the art, such as a random access memory, a flash memory, a read-only memory, a programmable read-only memory, an electrically erasable programmable memory, or a register. The storage medium is located in the memory 904, and the processor 903 reads information in the memory 904 and completes the steps in the foregoing methods in combination with hardware of the processor.

The receiver 901 may be configured to receive input digital or character information, and generate signal input related to setting and function controls of the network device. The transmitter 902 may include a display device such as a display screen, and the transmitter 902 may be configured to output digital or character information by using an external interface.

In this embodiment of this application, the processor 903 is configured to perform the foregoing cell handover measurement indication method performed by a network device.

Figure 10:
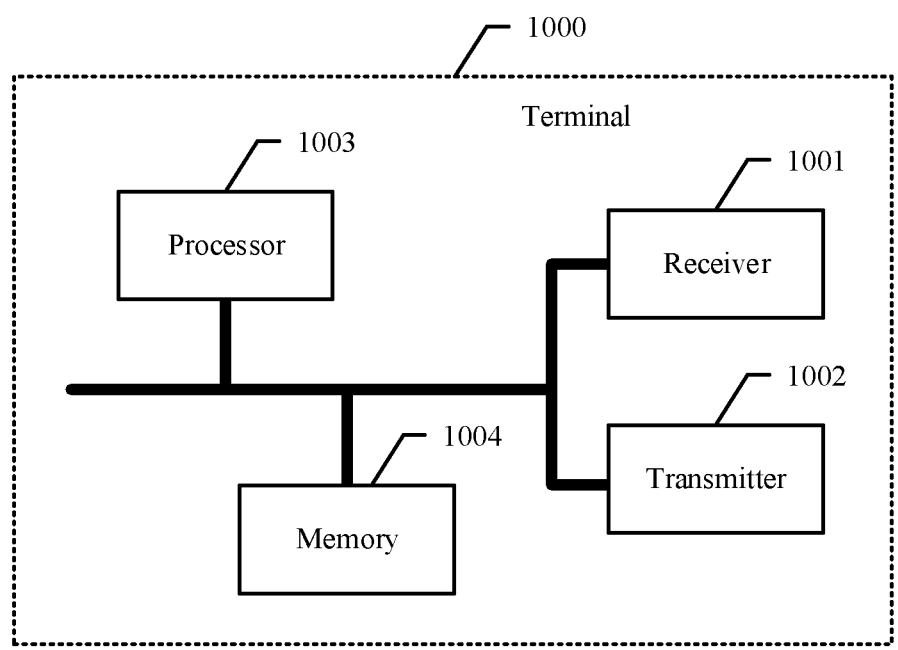
FIG. 10 is a schematic structural diagram of another terminal according to an embodiment of this application.

The following describes another terminal according to an embodiment of this application. Referring to FIG. 10, a terminal 1000 includes:

a receiver 1001, a transmitter 1002, a processor 1003, and a memory 1004 (where there may be one or more processors 1003 in the terminal 1000, and one processor is used as an example in FIG. 10). In some embodiments of this application, the receiver 1001, the transmitter 1002, the processor 1003, and the memory 1004 may be connected by using a bus or in another manner. In FIG. 10, a connection by using the bus is used as an example.

The memory 1004 may include a read-only memory and a random access memory, and provide instructions and data to the processor 1003. A part of the memory 1004 may further include a non-volatile random access memory (non-volatile random access memory, NVRAM). The memory 1004 stores an operating system and an operation instruction, an executable module or a data structure, or a subset thereof, or an extended set thereof. The operation instruction may include various operation instructions to implement various operations. The operating system may include various system programs to implement various basic services and process hardware-based tasks.

The processor 1003 controls an operation of the terminal, and the processor 1003 may also be referred to as a central processing unit (CPU). In specific application, components of the terminal are coupled together by using a bus system. In addition to a data bus, the bus system may further include a power bus, a control bus, and a status signal bus. However, for clear description, various types of buses in the figure are marked as the bus system.

The methods disclosed in the embodiments of this application may be applied to the processor 1003, or implemented by the processor 1003. The processor 1003 may be an integrated circuit chip and has a signal processing capability. In an implementation process, the steps in the foregoing methods can be implemented by using a hardware integrated logical circuit in the processor 1003, or by using instructions in a form of software. The processor 1003 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor 1003 may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly executed and accomplished by using a hardware decoding processor, or may be executed and accomplished by using a combination of hardware and software modules in the decoding processor. The software module may be located in a storage medium mature in the art, such as a random access memory, a flash memory, a read-only memory, a programmable read-only memory, an electrically erasable programmable memory, or a register. The storage medium is located in the memory 1004, and the processor 1003 reads information in the memory 1004 and completes the steps in the foregoing methods in combination with hardware of the processor.

The receiver 1001 may be configured to receive input digital or character information, and generate signal input related to related setting and function control of the terminal. The transmitter 1002 may include a display device such as a display screen, and the transmitter 1002 may be configured to output digital or character information by using an external interface.

In this embodiment of this application, the processor 1003 is configured to perform the foregoing cell handover measurement indication method performed by a terminal.

In another possible design, a chip includes a processing unit and a communication unit. The processing unit may be, for example, a processor, and the communication unit may be, for example, an input/output interface, a pin, or a circuit. The processing unit may execute a computer executable instruction stored in a storage unit, so that the chip in the terminal performs the foregoing cell handover measurement indication method performed by a terminal or a network device. Optionally, the storage unit is a storage unit in the chip, for example, a register or a buffer. Alternatively, the storage unit may be a storage unit that is in the terminal and that is located outside the chip, for example, a read-only memory (ROM), or another type of static storage device that can store static information and instructions, or a random access memory (RAM).

The processor mentioned anywhere above may be a general-purpose central processing unit, a microprocessor, an ASIC, or one or more integrated circuits for controlling program execution of the method in the first aspect.

In addition, it should be noted that the described apparatus embodiments are merely examples. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided by this application, connection relationships between modules indicate that the modules have communication connections with each other, which may be specifically implemented as one or more communication buses or signal cables.

Based on the description of the foregoing implementations, a person skilled in the art may clearly understand that this application may be implemented by software in addition to necessary universal hardware, or by dedicated hardware including an application-specific integrated circuit, a dedicated CPU, a dedicated memory, a dedicated component, and the like. Generally, any function that can be performed by a computer program can be easily implemented by corresponding hardware. Moreover, a specific hardware structure used to achieve a same function may be in various forms, for example, in a form of an analog circuit, a digital circuit, a dedicated circuit, and the like. However, for this application, software program implementation is a better implementation in most cases. Based on such an understanding, the technical solutions of this application essentially or the part contributing to the prior art may be implemented in a form of a software product. The software product is stored in a readable storage medium, such as a floppy disk, a USB flash drive, a removable hard disk, a ROM, a RAM, a magnetic disk, or a CD-ROM of a computer, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on the computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A cell handover measurement indication method in a satellite network, comprising:
    calculating, by a network device, a measurement moment of a satellite network cell handover based on a measurement event, the measurement event comprising at least one of a first measurement event or a second measurement event, the first measurement event occurring when a first distance between the terminal and a center point of a serving cell is greater than a first threshold, and the second measurement event occurring when a second distance between the terminal and the network device is greater than a second threshold, the measurement moment comprising one or more of a measurement start moment, a measurement end moment, or a time offset comprising a time difference between the measurement start moment and the measurement end moment, the measurement event comprising a location relationship between a terminal and the network device; and
    sending, by the network device, a measurement indication, the measurement indication carrying the measurement moment, the measurement indication indicating the terminal is to perform a cell handover measurement.

2. The indication method according to claim 1, wherein the measurement indication comprises the measurement moment of one or more cells, and the one or more cells include the serving cell.

3. The indication method according to claim 1, wherein:
    the network device is a communication satellite;
    the first threshold and/or the second threshold are determined based on at least one of a first cell handover delay, a cell diameter corresponding to the serving cell, an orbit height of the communication satellite, a motion speed of the communication satellite, or a service type of the terminal; and the first cell handover delay comprises a delay of handover between cells covered by a same communication satellite or a delay of handover between cells covered by different communication satellites.

4. The indication method according to claim 1, wherein:
the network device is a base station;
the first threshold and/or the second threshold are determined based on at least one of a second cell handover delay, a cell diameter corresponding to the serving cell, or a service type of the terminal; and
the second cell handover delay comprises a delay of handover between cells covered by a same base station, or a delay of handover between cells covered by different base stations.

5. The indication method according to claim 1, wherein the sending, by the network device, the measurement indication comprises:
sending, by the network device, the measurement indication using a radio resource control message or downlink control information.

6. A cell handover measurement indication method in a satellite network, comprising:
receiving, by a terminal, a measurement indication, the measurement indication indicating the terminal is to perform a cell handover measurement, the measurement indication carrying a measurement moment of a satellite network cell handover, the measurement moment is obtained by a network device through calculation based on a measurement event, the measurement event comprising at least one of a first measurement event or a second measurement event, the first measurement event occurring when a first distance between the terminal and a center point of a serving cell is greater than a first threshold, and the second measurement event occurring when a second distance between the terminal and the network device is greater than a second threshold, the measurement moment comprising one or more of a measurement start moment, a measurement end moment, or a time offset comprising a time difference between the measurement start moment and the measurement end moment, and the measurement event comprising a location relationship between the terminal and the network device; and
performing, by the terminal, the cell handover measurement based on the measurement indication.

7. The indication method according to claim 6, wherein the measurement indication comprises the measurement moment of one or more cells, and the one or more cells include the serving cell.

8. The indication method according to claim 6, wherein:
the network device is a communication satellite;
the first threshold and/or the second threshold are determined based on at least one of a first cell handover delay, a cell diameter corresponding to the serving cell, an orbit height of the communication satellite, a motion speed of the communication satellite, or a service type of the terminal; and
the first cell handover delay comprises a delay of handover between cells covered by a same communication satellite or a delay of handover between cells covered by different communication satellites.

9. The indication method according to claim 6, wherein:
the network device is a base station;
the first threshold and/or the second threshold are determined based on at least one of a second cell handover delay, a cell diameter corresponding to the serving cell, or a service type of the terminal; and
the second cell handover delay comprises a delay of handover between cells covered by a same base station or a delay of handover between cells covered by different base stations.

10. The indication method according to claim 6, wherein the receiving, by the terminal, a measurement indication comprises:
receiving, by the terminal, the measurement indication using a radio resource control message or downlink control information.

11. The indication method according to claim 6, wherein the indication method further comprises:
sending, by the terminal, a measurement report, wherein the measurement report is generated based on a result of the cell handover measurement; or
performing, by the terminal, cell handover based on a result of the cell handover measurement.

12. A terminal, comprising:
a memory storing instructions; and
at least one processor in communication with the memory, the at least one processor configured, upon execution of the instructions, to perform the following steps:
receive a measurement indication, the measurement indication indicating the terminal is to perform a cell handover measurement, the measurement indication carrying a measurement moment of a satellite network cell handover, the measurement moment comprising one or more of a measurement start moment, a measurement end moment, or a time offset comprising a time difference between the measurement start moment and the measurement end moment, the measurement event comprising at least one of a first measurement event or a second measurement event, the first measurement event occurring when a first distance between the terminal and a center point of a serving cell is greater than a first threshold, and the second measurement event occurring when a second distance between the terminal and the network device is greater than a second threshold, the measurement moment is obtained by a network device through calculation based on a measurement event, and the measurement event comprising a location relationship between the terminal and the network device; and
perform the cell handover measurement based on the measurement indication.

13. The terminal according to claim 12, wherein the measurement indication comprises the measurement moment of one or more cells, and the one or more cells comprise a serving cell.

14. The terminal according to claim 12, wherein:
the network device is a communication satellite;
the first threshold and/or the second threshold are determined based on at least one of a first cell handover delay, a cell diameter corresponding to the serving cell, an orbit height of the communication satellite, a motion speed of the communication satellite or a service type of the terminal; and
the first cell handover delay comprises a delay of handover between cells covered by a same communication satellite or a delay of handover between cells covered by different communication satellites.

15. The terminal according to claim 12, wherein:
the network device is a base station;
- the first threshold and/or the second threshold are determined based on at least one of a second cell handover delay, a cell diameter corresponding to the serving cell, or a service type of the terminal; and
- the second cell handover delay comprises a delay of handover between cells covered by a same base station or a delay of handover between cells covered by different base stations.

16. The terminal according to claim 12, wherein the processor is configured to execute the instructions to:
receive the measurement indication using a radio resource control message or downlink control information.

* * * * *